J. H. BOYDEN.
ELECTRIC INDICATING SYSTEM.
APPLICATION FILED OCT. 2, 1906. RENEWED JULY 17, 1914.

1,131,202.  Patented Mar. 9, 1915.

Witnesses
James M. Drysdale
H. H. Byrne

Inventor
J. Hanson Boyden.

UNITED STATES PATENT OFFICE.

JOHN HANSON BOYDEN, OF GLENN DALE, MARYLAND.

ELECTRIC INDICATING SYSTEM.

1,131,202.  Specification of Letters Patent.  Patented Mar. 9, 1915.

Application filed October 2, 1906, Serial No. 337,142. Renewed July 17, 1914. Serial No. 851,645.

*To all whom it may concern:*

Be it known that I, JOHN HANSON BOYDEN, a citizen of the United States, residing at Glenn Dale, in the county of Prince Georges and State of Maryland, have invented certain new and useful Improvements in Electric Indicating Systems, of which the following is a specification.

My invention relates to electrically operated devices for indicating the position of a movable object at a distance therefrom, and more especially to that type of indicator, which is adapted for actuation by an alternating current.

My invention is particularly adapted for use in connection with railroad switches and signals, or similar devices, in which the movable object is so located as to be exposed to the elements, or is liable to become clogged by natural accumulations, but is equally applicable to other uses.

Such indicators, as heretofore constructed, have depended for their action upon the opening and closing of an electric circuit by means of suitable contacts controlled by the movements of the object, the position of which is to be indicated, and great difficulty has been experienced in maintaining such contacts clean and bright so as to insure proper electrical connection. Failure has often resulted from the contacts becoming oxidized, fused or otherwise deranged. Furthermore, indicators of this type have usually been arranged to indicate only the extreme or final positions of the movable object, and not the intermediate positions.

One object, therefore, of my invention is to provide an indicating system in which there are no electric contacts whatever.

Another object of my invention is to produce an indicator which will show all intermediate as well as the final positions of the movable object.

Another object of my invention is to produce an indicating system, operating as described, in which but a single circuit is employed.

With the above and other objects in view, my invention consists in the construction and arrangement of parts hereinafter described, and illustrated in the accompanying drawings.

In these drawings I have shown several embodiments of my invention as applied to railroad switches and signals, but I desire it to be understood that my invention is not by any means limited to such use, but, in its more generic features, admits of very general application.

Figure 1:
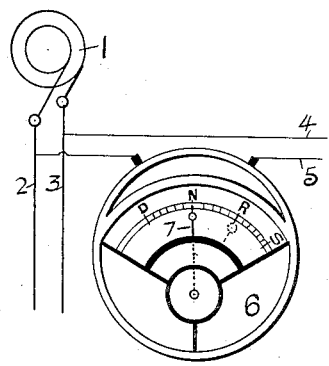
Figure 2:
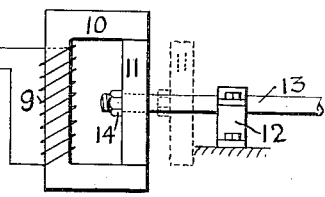
Figure 2:
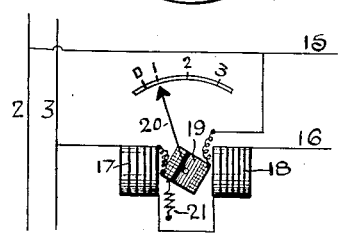
Figure 3:
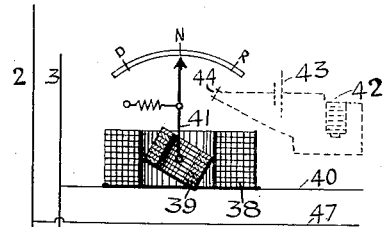
Figure 9:
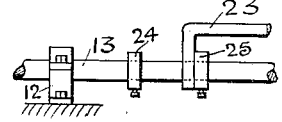
Figure 4:
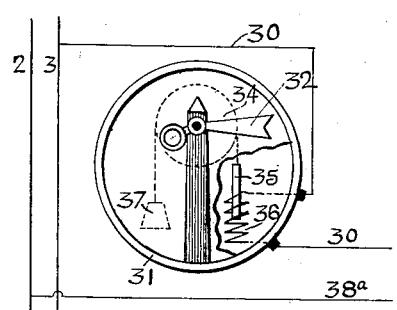

In the drawings Figure 1 is a diagrammatic view of one form of my invention. Figs. 2, 3 and 4 are modifications of the indicator. Figs. 5, 6, 7 and 8 are modified forms of another feature of my invention. Fig. 9 is a modified detail.

As is well known, in an alternating circuit containing inductance, Ohm's law does not obtain. The fundamental relation in such a circuit is expressed by:—

$$C = \frac{E}{\sqrt{R^2 + 4\pi^2 N^2 L^2}}$$

in which C is the current in amperes, E the impressed volts, R the ohmic resistance, N the frequency, and L the inductance, (in henries). The quantity under the radical is known as the impedance, and it is evident the current flowing in the circuit is inversely proportional to this quantity.

The frequency and voltage remaining the same, as is usually the case, there are two ways of varying the current in the circuit, viz: by changing the ohmic resistance, as by a rheostat, or by changing the inductance, or self-induction of the circuit. I propose to utilize the latter method to produce the results outlined above.

In the drawings I have shown a number of ways in which the self induction of a circuit may be varied.

In Fig. 1 I have illustrated an ordinary ammeter, 6, of any preferred construction, in series with a source of alternating current 1, and a reactance coil, 9, by means of the wires 2, 3, 4 and 5. The ammeter constitutes the indicator, and is located in the signal tower, or other suitable point. The coil, 9, is located at or near the switch or movable object, and is wound upon a frame or core, 10, formed preferably of soft sheet iron punchings. One side of the frame, as 11, is movable, and is attached, as by a nut 14, to a rod, 13, supported in suitable guides, as 12, and connected with the switch or signal movement. When the switch, for instance, is in its normal, closed position, the movable part 11, will fit in between the legs of the core, 10, snugly, thereby forming with the core a closed magnetic circuit of small reluctance. A heavy magnetic flux will therefore be induced by the current in coil, 9, which, in turn, reacting on the coil, will cause its self-induction to rise to a high value. This, of course, will have the effect of choking back most of the current, allowing very little to flow. The action is the same as in the common transformer, which in the usual practice, is left, with secondary open, permanently connected to the feeders, but taking almost no current, owing to the reactance caused by the core.

The pointer, or movable element, 7, of the indicator, will, under the conditions described, assume a position which I have designated by the letter N, and should show the normal position of the switch. When, however, the switch is open, the part 11 is drawn away from the core, 10, thus interposing a large air gap in the magnetic circuit, increasing its reluctance, and greatly reducing the reactance of the coil. Hence, more current flows, and the pointer will assume a position which I have marked R, and which should correspond to the reverse position of the switch or signal. In case, at any time, the line should become broken, or the current fail from any cause, the pointer will swing to zero position, which I have designated D, and which would be indicative of a defect in the system. It is to be noted that, should the switch become clogged, and stop in any intermediate position, it would result in the part 11 being partly displaced, and the pointer assuming an intermediate position, thus indicating the fact. It is also to be noted that, should a cross or short-circuit occur at any point on the line 4, 5, the heavy current resulting would cause the pointer to indicate the fact, by swinging far around toward the point marked S. It is, of course, understood, that suitable fuses are inserted at proper points in the circuit for protecting the same against overloads.

The presence of an inductance or reactance coil in the circuit has, besides increasing the apparent resistance of the circuit, another effect. It displaces the current, so as to cause it to lag behind the E. M. F. in phase. In other words, the cosine of the angle of lag, known generally as the "power factor," decreases as the inductance of the circuit increases, and may vary from unity, for a non-inductive load, to a small fraction, for a circuit of which the self-induction is high. Instruments have been devised known as power-factor indicators, the pointers of which move in accordance with the change in self-induction of the circuit including them. I propose to use such an instrument as a position indicator in one form of my invention, diagrammatically illustrated in Fig. 2. The instrument is constructed on the principal of the dynamometer, and is provided with a small pivoted "pressure coil," as 19, and a pair of fixed "current coils," as 17, 18. The latter are in series with the load, and the former is connected across the line, after the manner of an indicating wattmeter. Changes in the reactance of the circuit due to changes in position of the movable part, as 11, produce corresponding movements of the pointer, 20, which is carried by the pivoted coil, and thus indicate the position of such movable part.

It may be desirable to arrange the dial, as shown in Fig. 2, having positions "1," "2," "3," etc. This would be especially useful in connection with a three position signal.

Other forms of indicating instruments may be employed. In Fig. 3, for instance, I have shown a form of repulsion type ammeter, designed by Thomson, and described by him in his Patent #363,186. The movable element consists of a pile of copper rings, 39, pivoted within a coil 38. The rings tend to set themselves at right angles to the coil, when the latter is traversed by an alternating current. As shown in dotted lines in this figure, the instrument may be used as a relay, the pointer, 41, when in its extreme position, serving to close a circuit, at 44, including a source of current, 43, and some translating device, 42, as, for example, the lock magnet of an interlocking machine.

In Fig. 4, I have illustrated the application of the plunger-type ammeter principle to the actuation of a miniature signal, 32, inclosed in a case, 31, and commonly known as a "repeater." A light iron plunger, 35, is located within a solenoid, 36, connected in series with the line, and is attached to the signal as by means of a cord and pulley, 34, the cord carrying at its other end a counterweight, as 37. It is understood that the reactance of this solenoid is so small as to be negligible.

Figure 5:
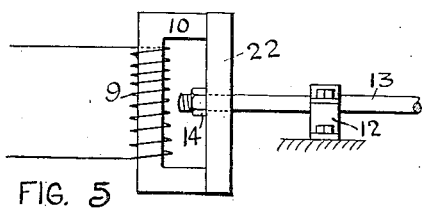
Figure 6:
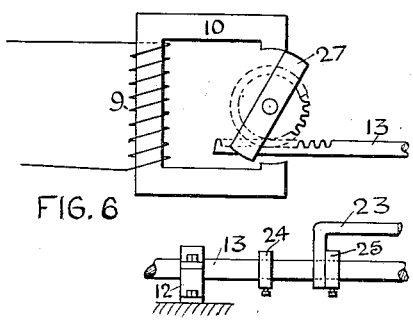

Figs. 5 and 6 illustrate slightly modified forms of the construction shown in Fig. 1, and need no further description.

In some cases it may be desirable to employ a lost motion device between the movable part, as 11, and the movable object, in order that the part 11 may only be moved at the limits of the stroke of the movable object. This may be done as shown in Fig. 9 by arranging two collars, 24, 25, on the rod 13, and a loose ring carried by a rod, 23, working between them.

Figure 7:
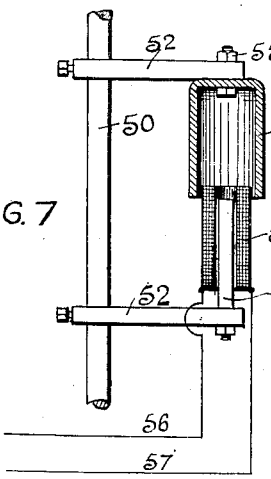

In Fig. 7, I have shown another and preferred form of device for varying the reactance of a coil in accordance with the positions of a movable object. I have illustrated the same as associated with the "up and down rod," 50, of a semaphore signal. The coil, 51, is attached to the post or other fixed support (not shown), and is connected to the indicating circuit in the same manner as coil, 9, in Fig. 1. Brackets, 52, are adjustably secured to the rod, 50, by means of set screws. The lower bracket carries a soft iron core, 54, adapted to fit the interior of the coil. The upper bracket carries a closed tube, 53, of copper, aluminum, or other good conducting material. This tube is of a size to snugly inclose coil, 51, and may be so arranged with reference to plunger or core, 54, that the core begins to leave the coil as the tube beings to embrace it. As the tube is lowered over the coil, the action is the same as that which takes place upon shortcircuiting the secondary of a transformer, and results in very greatly increasing the current in the coil. In fact, the tube constitutes a closed secondary of one turn. At the same time, the iron core is withdrawn from the coil, thereby decreasing its self-induction. Hence, small movements of the signal or other object, produce comparatively large variations of current. Either the core, 54, or the tube, 53, may, however, be employed alone, and give good results. It is, of course, understood that any of the indicators shown in Figs. 1, 2, 3 and 4 may be used in connection with any of the devices illustrated in the other figures.

Figure 8:
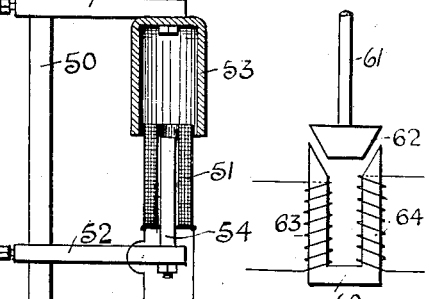

In Fig. 8, I have shown a transformer, provided with two coils, and comprising a core, 60, having a beveled movable part, 62, carried by a rod, 61. This construction may be employed instead of the single coil devices, if found desirable. In some cases it may be advantageous to connect the secondary of the transformer to the indicator, and the primary to the source of current.

It will be noted that, in all of the constructions illustrated, the indicator is included in a permanently closed circuit, the ohmic resistance of which is constant. By making the frequency high, the variations in reactance, for a given change of flux, will be wider, and the corresponding fluctuations of current, or of power factor, more pronounced. By constructing the reactance coils so that their maximum self-induction will be large, the normal expenditure of power in the circuit can be made almost negligible.

While I have shown and described my invention as applied to a railway switch or signal indicator, or the like, it will be apparent that the same principle may be employed in any apparatus whatever, where it is desirable to cause a movable element to move in synchronism with a second movable element, member, or object, situated at a distance from the first. Motion imparted to one will thus induce corresponding motion in the other. As an illustration, my invention may be particularly useful in electric signaling apparatus of that class designed to transmit orders or signals from one remote point to another, as on shipboard. Here, inductive elements, moved by the hand of the captain, would cause corresponding movements of an indicator needle in the engine room. Also, apparatus such as shown in Fig. 7, would, if attached to the rudder mechanism, serve admirably to operate a tell tale for the position of the rudder.

Alternating current has now become common in signaling work, and is available in almost every town. If not at hand, however, a sufficient amount for actuating a large number of my indicators may be obtained from a small rotary converter.

I am aware that heretofore systems have been devised employing a momentary impulse of induced current for signaling in a permanently closed circuit, but to such I make no claim.

I believe the principles herein involved to be both novel and generic, and I, therefore, do not wish to limit myself to the particular embodiments shown and described, but

I claim, broadly, as follows:—

1. In an electric signaling system, a transmitter and a receiver, said receiver comprising a movable element, and electrically operated means for moving the same, and said transmitter comprising a coil and a mass of magnetic metal, means for progressively producing at will a relative shifting of position between said mass and coil, in accordance with the signal to be transmitted, means for causing a periodic current to flow in said coil and a corresponding flux in the mass of metal, and a single pair of conductors constituting a permanently closed circuit connecting said transmitting and receiving devices, and including said coil.

2. In an electric signaling system, a transmitter and a receiver, said receiver comprising a movable element, and electrical means for operating the same, and said transmitter comprising a coil and a mass of magnetic metal adjacent thereto, means for creating a periodically varying magnetic flux through said coil, means for progressively changing at will the relative position of said mass and coil in accordance with the signal to be transmitted, and thus producing corresponding changes in the value of such flux, and a single pair of conductors constituting the sole connection between said transmitter and receiver, said conductors including the said coil and operating means in a permanently closed circuit.

3. In an electric signaling system, a transmitter and a receiver, said receiver comprising a movable element, and means for operating the same, and said transmitter comprising a mass of magnetic metal, and a coil, a single pair of conductors connecting the ends of said coil with said operating means, and constituting a permanently closed circuit, means for impressing a periodically varying electromotive force on said circuit, and means for shifting at will the relative position of said coil and mass so as to vary the induction of said coil as desired, whereby a similar movement is imparted to the movable element of said receiver.

4. In an electric signaling system, a receiving instrument comprising a movable pointer, said receiving instrument being responsive to variations in current strength, a transmitting instrument comprising a coil and a mass of magnetic material, a single permanently closed circuit extending from one to the other of said instruments and including said coil, said circuit being the sole connection between said instruments, means for continuously generating a periodic current in said circuit, and means for progressively shifting the relative position of such coil and mass so as to vary the strength of such current in accordance with the signal to be transmitted.

5. In an electric signaling system, a transmitter comprising a coil, a core of magnetic material associated therewith, means for producing a current in said coil and a magnetic flux in said core, means for progressively varying the flux in said core in accordance with the signal to be transmitted, a receiver comprising a movable element responsive to such flux variations, and a single, permanently closed circuit extending from said coil to said receiver, such circuit being the sole connection between said transmitter and receiver.

6. In combination, a reactance coil, an electric indicator connected therewith and controlled wholly thereby, a movable object, and means independent of said coil for varying its reactance progressively in accordance with the position of such object.

7. In a signaling system, a transmitter and a receiver, said transmitter comprising a coil, a circuit connecting said transmitter and receiver and including said coil, means for impressing a periodic electromotive force on said circuit, and means for varying the self induction of said coil so as to vary the current characteristic of said circuit, said means comprising a mass of magnetic material and a mass of non-magnetic conducting material, and means for shifting the position of said masses relative to said coil.

8. A system for indicating the position of a movable device, comprising an indicator responsive to alternating currents, a circuit therefor, including a reactance coil and an alternating current generator, and means for varying the reactance of said coil, comprising a conducting tube adapted to be so moved as to embrace said coil to an extent proportional to the displacement of such device.

9. In an electric signaling system, an indicator responsive to variations in current strength, a single circuit including said indicator, a source of periodic current and a reactance coil, and means for progressively varying the reactance of said coil, such means comprising a closed conducting loop of low resistance, and means for displacing said loop relative to said coil to an extent proportional to the signal to be produced.

10. In combination a movable object and a movable element remote therefrom, and means for compelling said element to move synchronously with said object, said means comprising a single circuit wholly controlling said element, and a magnetic member governed in its movements by said object, and serving to vary the self-induction of said circuit.

11. In a system for electrically transmitting signals, a single, permanently closed circuit of constant ohmic resistance, means for varying at will the self induction of said circuit in accordance with the signal to be transmitted and an indicator in said circuit having a movable element controlled wholly thereby, and responsive to such variations.

12. In a system for electrically transmitting signals, a single permanently closed circuit of constant ohmic resistance, means for varying at will the impedance of said circuit in accordance with the signal to be transmitted and an indicator in said circuit having a movable element controlled wholly thereby and responsive to such variations.

13. In a system of signaling, a source of periodic current, a transmitting device comprising a coil, and means for varying at will the impedance thereof in accordance with the signal to be sent, a receiving device comprising an indicator comprising a movable element responsive to the character or amount of current passing therethrough, and a single, permanently closed circuit connecting said transmitting coil, receiving indicator, and source of current in series.

In testimony whereof I have signed my name to this specification in the presence of two subscribing witnesses.

J. HANSON BOYDEN.

Witnesses:
JAMES M. DRYSDALE,
H. H. BYRNE.